US012682381B2

(12) United States Patent
Vosseller et al.

(10) Patent No.: US 12,682,381 B2
(45) Date of Patent: Jul. 14, 2026

(54) SECURITY DEPOSITS USING TOKENIZED REPUTATION SCORES

(71) Applicant: eBay Inc., San Jose, CA (US)

(72) Inventors: Shannon Bruce Vosseller, Zürich (CH); Andrew Chalkley, Portland, OR (US)

(73) Assignee: eBay Inc., San Jose, CA (US)

( * ) Notice: Subject to any disclaimer, the term of this patent is extended or adjusted under 35 U.S.C. 154(b) by 302 days.

(21) Appl. No.: 17/492,924

(22) Filed: Oct. 4, 2021

(65) Prior Publication Data

US 2023/0103398 A1     Apr. 6, 2023

(51) Int. Cl.
| | |
|---|---|
| *G06Q 30/00* | (2023.01) |
| *G06Q 20/12* | (2012.01) |
| *G06Q 20/36* | (2012.01) |
| *G06Q 30/06* | (2023.01) |
| *G06Q 30/0601* | (2023.01) |

(52) U.S. Cl.
CPC ......... *G06Q 30/0609* (2013.01); *G06Q 20/12* (2013.01); *G06Q 20/367* (2013.01); *G06Q 30/06* (2013.01); *G06Q 2220/00* (2013.01)

(58) Field of Classification Search
CPC ........ G06Q 30/06; G06Q 20/12; G06Q 20/02; G06Q 20/4016; G06Q 20/367
See application file for complete search history.

(56) References Cited

U.S. PATENT DOCUMENTS

| | | | |
|---|---|---|---|
| 8,194,550 B2 | 6/2012 | Shorey et al. | |
| 8,719,154 B2 * | 5/2014 | Shastry .............. | G06Q 30/0283 705/39 |
| 10,268,829 B2 | 4/2019 | Roets et al. | |
| 10,546,296 B2 | 1/2020 | Narasimhan et al. | |

(Continued)

FOREIGN PATENT DOCUMENTS

WO          2015191741 A1     12/2015

OTHER PUBLICATIONS

"A Privacy-Preserving and Robust Reputation System Based on Blockchain," by Shuai Sun, Yuan Liu, and Guibing Guo, 2019 IEEE Conference on Parallel and Distributed Processing with Applications, Big Data & Cloud Computing, Sustainable Computing & Communications, Social Computing & Networking, 2019 (Year: 2019).*

(Continued)

*Primary Examiner* — Anne M Georgalas
(74) *Attorney, Agent, or Firm* — FIG. 1 Patents

(57)          ABSTRACT

Techniques are described, as implemented by computing devices, to control access to transactions through use of security deposits based on tokenized reputation scores. This is performed by leveraging a blockchain such that tokenized reputation scores are generated based on amounts of cryptographic reputation tokens associated with blockchain account addresses associated with service provider accounts. Access to transactional functionality is controlled for a service provider account by using an amount of cryptographic reputation tokens as a security deposit, where the (Continued)

800

802
Receive a request to participate in a transaction

804
Determine a reputation score affiliated with a service provider account based on a first amount of reputation tokens associated with a blockchain account address associated with the service provider account 806
Transmit a response specifying a second amount of reputation tokens to be transferred as a security deposit for the service provider account to participate in the transaction, the security deposit calculated based on the reputation score 808
Determine whether the transaction is permitted by monitoring for completion of a transfer of the security deposit from the blockchain account address associated with the service provider account 810
Control access to the service provider account to participate in the transaction based on the monitoring security deposit is calculated based on a tokenized reputation score of the service provider account. Further, return of a security deposit is controlled for a service provider account based on a determination of a successful or unsuccessful completion of a transaction.

20 Claims, 9 Drawing Sheets

(56) References Cited

U.S. PATENT DOCUMENTS

| | | | |
|---|---|---|---|
| 11,133,936 B1 | 9/2021 | Branton | |
| 11,165,787 B2 | 11/2021 | Sloane et al. | |
| 11,392,947 B1 * | 7/2022 | Prasad | G06Q 20/40155 |
| 11,449,819 B2 | 9/2022 | Heath et al. | |
| 11,652,604 B2 | 5/2023 | Gundavelli et al. | |
| 11,748,746 B2 | 9/2023 | Pillai et al. | |
| 11,748,793 B2 | 9/2023 | Vosseller et al. | |
| 11,861,400 B2 | 1/2024 | Wentz | |
| 12,632,862 B2 | 5/2026 | Vosseller et al. | |
| 2006/0184440 A1 * | 8/2006 | Britti | G06Q 40/00 |
| | | | 705/35 |
| 2009/0006115 A1 * | 1/2009 | Schwarz | G06Q 10/067 |
| | | | 705/348 |
| 2010/0201543 A1 | 8/2010 | Shorey et al. | |
| 2011/0106643 A1 * | 5/2011 | Berkowitz | G06Q 30/08 |
| | | | 705/26.3 |
| 2014/0236749 A1 * | 8/2014 | Yang | G06Q 30/06 |
| | | | 705/26.2 |
| 2015/0356630 A1 * | 12/2015 | Hussain | H04L 51/212 |
| | | | 705/14.69 |
| 2017/0140394 A1 * | 5/2017 | Cao | G06Q 30/0201 |
| 2017/0300912 A1 | 10/2017 | Narasimhan et al. | |
| 2017/0364920 A1 | 12/2017 | Anand | |
| 2019/0095631 A1 | 3/2019 | Roets et al. | |
| 2019/0303807 A1 | 10/2019 | Gueye | |
| 2019/0312734 A1 | 10/2019 | Wentz et al. | |
| 2020/0027089 A1 * | 1/2020 | Kuchar | G06Q 20/4016 |
| 2020/0034457 A1 | 1/2020 | Brody et al. | |
| 2020/0052917 A1 | 2/2020 | Corral et al. | |
| 2020/0067696 A1 | 2/2020 | Sarin | |
| 2020/0162261 A1 | 5/2020 | Iyer | |
| 2020/0219150 A1 * | 7/2020 | Johnston | G06Q 30/0282 |
| 2020/0313897 A1 | 10/2020 | Heath et al. | |
| 2020/0410460 A1 | 12/2020 | Nissan et al. | |
| 2021/0064780 A1 | 3/2021 | Riedel et al. | |
| 2021/0067518 A1 | 3/2021 | Sloane et al. | |
| 2021/0160082 A1 | 5/2021 | Wang | |
| 2021/0174247 A1 | 6/2021 | Poletti et al. | |
| 2021/0176340 A1 | 6/2021 | Rose | |
| 2021/0390531 A1 | 12/2021 | Voorhees et al. | |
| 2022/0150050 A1 | 5/2022 | Gundavelli et al. | |
| 2023/0108817 A1 | 4/2023 | Vosseller et al. | |
| 2023/0108983 A1 | 4/2023 | Vosseller et al. | |
| 2023/0113795 A1 | 4/2023 | Vlahovic et al. | |
| 2023/0135294 A1 | 5/2023 | Vosseller et al. | |
| 2023/0360097 A1 | 11/2023 | Vosseller et al. | |
| 2024/0169388 A1 | 5/2024 | Vlahovic et al. | |
| 2024/0394704 A1 | 11/2024 | Vosseller et al. | |

OTHER PUBLICATIONS

"Reputation in Online Auctions: The Market for Trust," by Jennifer Brown and John Morgan, California Management Review, vol. 49, No. 1, Fall 2006 (Year: 2006).*

Abdo et al., "Permissionless reputation-based consensus algorithm for blockchain", Internet Technology Letters, 3(3), e151, Retrieved from Internet URL: https://doi.org/10.1002/it/2.151, Apr. 1, 2020, 6 Pages.

Khairuddin, Irnie. , "Understanding and Designing for Trust in Bitcoin Blockchain", Lancaster University, School of Computing and Communications, Apr. 2019, 350 Pages.

"A group of experts intends to sell the Colosseum . . . in digital format", Translated by ContentEngine LLC. CE Noticias Financieras, English ed. [Miami], Jul. 27, 2021, 2 pages.

"Blockchain Video Platform Viuly.io Connects to Ethereum Mainnet", Cision, PR Newswire [retrieved Mar. 28, 2023]. Retrieved from the Internet <https://www.prnewswire.com/news-releases/blockchain-video-platform-viulyio-connects-to-ethereum-mainnet-300589200.html>, Jan. 27, 2018, 4 pages.

"The genesis, vision and what makes Decentralized Reputation System", M2 Presswire [Coventry] Retrieved from the Internet <http://www.m2.com>, Jun. 1, 2018, 3 pages.

U.S. Appl. No. 17/492,894, filed Jun. 22, 2023 , "Corrected Notice of Allowability", U.S. Appl. No. 17/492,894, Jun. 22, 2023, 11 pages.

U.S. Appl. No. 17/492,894, filed Mar. 28, 2023 , "Non-Final Office Action", U.S. Appl. No. 17/492,894, Mar. 28, 2023, 26 pages.

U.S. Appl. No. 17/492,894, filed Jun. 7, 2023 , "Notice of Allowance", U.S. Appl. No. 17/492,894, Jun. 7, 2023, 13 pages.

Ahn, Jaehong , et al., "A Model for Deriving Trust and Reputation on Blockchain-Based e-Payment System", Applied Sciences, vol. 9, No. 24 [retrieved Mar. 28, 2023]. Retrieved from the Internet <https://doi.org/10.3390/app9245362>, Dec. 8, 2019, 18 pages.

Eckhardt, Giana M, "Playing the Trust Game Successfully in the Reputation Economy", Volume & Issue: vol. 12, No. 2 [retrieved Mar. 28, 2023]. Retrieved from the Internet <https://doi.org/10.2478/nimmir-2020-0011>, Oct. 22, 2020, 8 pages.

Levin, Richard B, et al., "Bitcoin Investment Vehicles Beware—The SEC is Watching", BakerHostetler Blog, Baker & Hostetler LLP [retrieved Jun. 7, 2023]. Retrieved from the Internet <https://www.bakerlaw.com/alerts/bitcoin-investment-vehicles-beware-the-sec-is-watching>, Jun. 24, 2014, 3 pages.

U.S. Appl. No. 17/518,820, "Non-Final Office Action", U.S. Appl. No. 17/518,820, Jan. 19, 2024, 17 pages.

* cited by examiner

Figure 1:
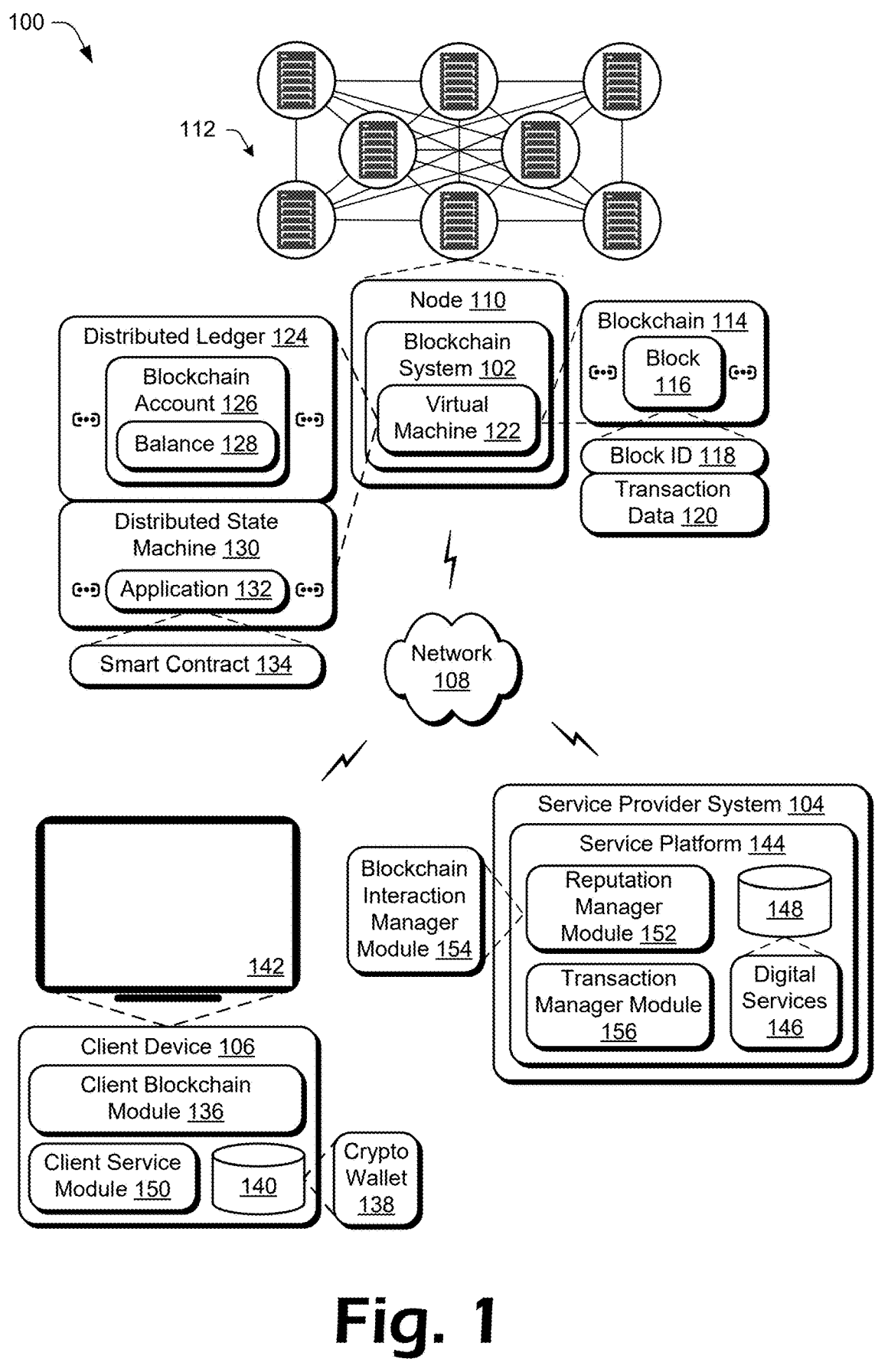

100

112

Node 110
Blockchain System 102
Virtual Machine 122

Distributed Ledger 124
Blockchain Account 126
Balance 128

Blockchain 114
Block 116

Block ID 118
Transaction Data 120

Distributed State Machine 130
Application 132

Smart Contract 134

Network 108

142

Service Provider System 104
Service Platform 144
Reputation Manager Module 152
148
Transaction Manager Module 156
Digital Services 146

Blockchain Interaction Manager Module 154

Client Device 106
Client Blockchain Module 136
Client Service Module 150
140
Crypto Wallet 138

@pendingpatent (★ 600)

142

302

Authentic

Luxury Watch

Listed by: @fugiocent    304

🕐 Sale ends today in 01:12:31

Top bid – Reserve price not met.

◆ 25 ($100,000)    306

> See full description

308

Join Auction Now

312

400

600

700

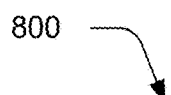

800

```
┌─────────────────────────────────────────────────────────┐
│                           802                           │
│        Receive a request to participate in a transaction │
└─────────────────────────────────────────────────────────┘
                            │
                            ▼
┌─────────────────────────────────────────────────────────┐
│                           804                           │
│  Determine a reputation score affiliated with a service │
│  provider account based on a first amount of reputation │
│  tokens associated with a blockchain account address     │
│  associated with the service provider account            │
└─────────────────────────────────────────────────────────┘
                            │
                            ▼
┌─────────────────────────────────────────────────────────┐
│                           806                           │
│  Transmit a response specifying a second amount of       │
│  reputation tokens to be transferred as a security       │
│  deposit for the service provider account to participate │
│  in the transaction, the security deposit calculated     │
│  based on the reputation score                           │
└─────────────────────────────────────────────────────────┘
                            │
                            ▼
┌─────────────────────────────────────────────────────────┐
│                           808                           │
│  Determine whether the transaction is permitted by       │
│  monitoring for completion of a transfer of the security │
│  deposit from the blockchain account address associated  │
│  with the service provider account                       │
└─────────────────────────────────────────────────────────┘
                            │
                            ▼
┌─────────────────────────────────────────────────────────┐
│                           810                           │
│  Control access to the service provider account to       │
│  participate in the transaction based on the monitoring  │
└─────────────────────────────────────────────────────────┘
```

SECURITY DEPOSITS USING TOKENIZED REPUTATION SCORES

BACKGROUND

In the last decade, the Internet has expanded dramatically. More and more people around the world connect to the Internet, becoming a part of the worldwide computer network. By connecting to the Internet, users have access to vast amounts of information, which they can use to fulfill their needs. For example, instead of going to a physical auction house, an Internet user can surf to an online auction website and place bids on an item listed.

Sometimes, the open access of users to transactions on the Internet result in adverse outcomes. Adverse outcomes result because uncontrolled access enables disreputable users to participate in transactions online. By way of example, a frustrating aspect of transacting online is the common occurrence of winning bidder accounts that do not pay for an item listed for an online auction. Not only do nonpaying bidder accounts waste a listing account's time, labor, and opportunities, but nonpaying bidder accounts also result in ruining honest bidding accounts' chances of winning an online auction. In this manner, conventional techniques for controlling access to transactions online do not account for the reputability of user accounts, and therefore facilitate adverse outcomes.

SUMMARY

Transaction access control techniques are described to control access to transactions by using security deposits based on tokenized reputation scores. These techniques are performed by computing devices by leveraging a blockchain such that cryptographic tokens establishing reputability— reputation tokens—are utilized to generate a tokenized reputation score for service provider accounts of a service provider system. Throughout this discussion, "tokenized reputation score" and "reputation score" are used interchangeably. Leveraging a blockchain for these techniques confers additional benefits. By way of example, participants of these tokenized reputation-based techniques are further empowered due to personal ownership and possession of the reputation tokens. In this way, people can invest in an indication of their reputability that can be freely utilized among many service provider systems because the data is controlled by the individual user instead of by a service provider system. Moreover, the cryptography and the decentralized design of blockchain and reputation tokens recorded on a blockchain provide the tokenized reputation scores with superior security in comparison to conventional, centralized methods of establishing reputation.

The described techniques include making transactional functionality available to a service provider account based on the service provider account providing a specified amount of reputation tokens as a security deposit. The security deposit is determined based on a tokenized reputation score affiliated with the service provider account. Further, when the service provider system detects a successful completion of a transaction affiliated with a security deposit, the security deposit is returned to a blockchain account address associated with a service provider account. In contrast, when the service provider system detects an unsuccessful completion of a transaction affiliated with a security deposit, the security deposit is withheld from a blockchain account address associated with a service provider account. In this manner, the service provider system controls access of a service provider account to transactional functionality by using a security deposit based on a tokenized reputation score affiliated with the service provider account.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

FIG. 1 is an illustration of an environment in an example blockchain implementation that is operable to employ security deposit techniques using tokenized reputation scores as described herein.

FIG. 8 is a flow diagram depicting a procedure in an example implementation of security deposit techniques using tokenized reputation scores.

DETAILED DESCRIPTION

Overview

Figure 2:
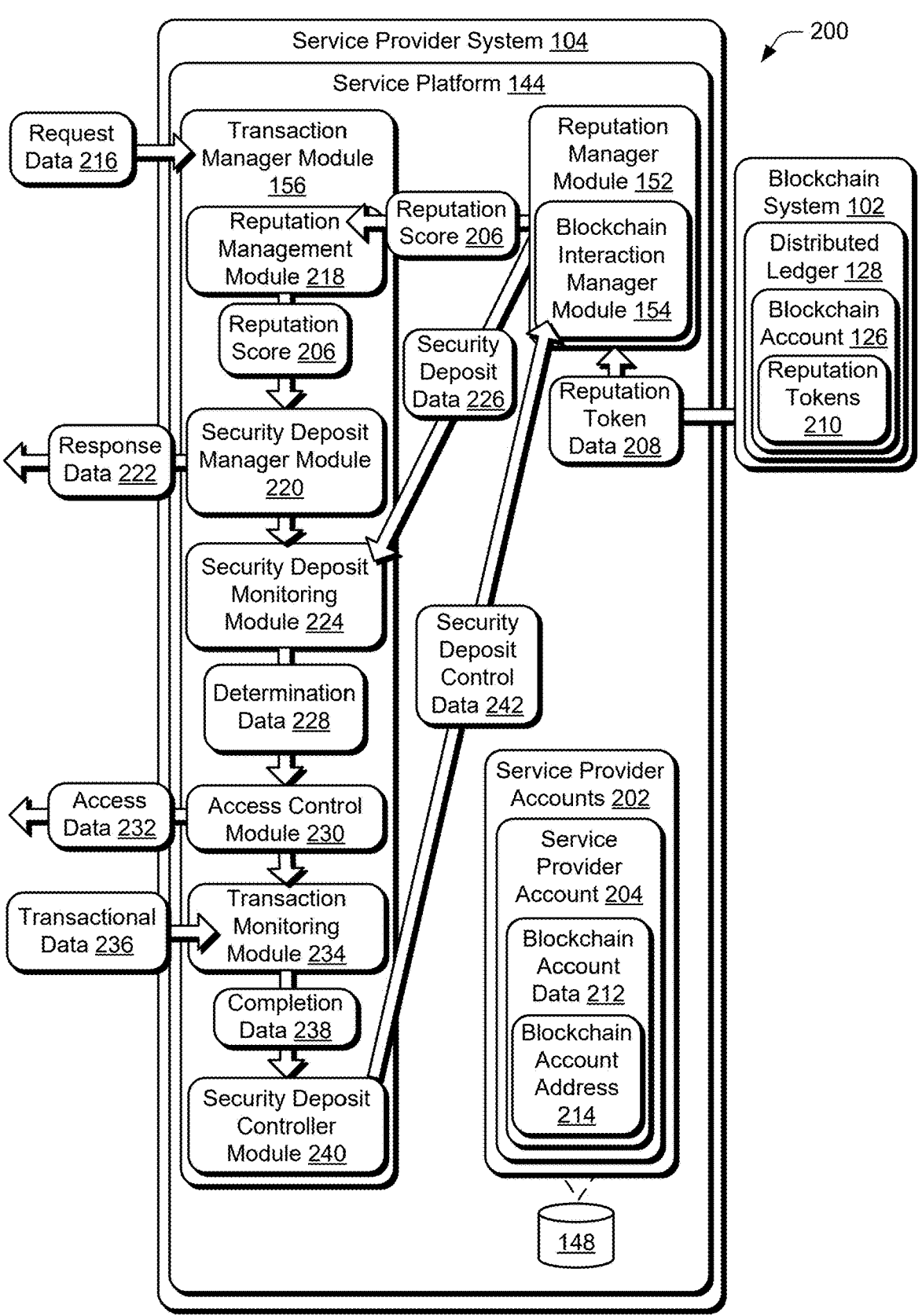
FIG. 2 depicts a system in an example system showing operation of a service platform of a service provider system of FIG. 1 in greater detail as controlling access of a service provider account to a transaction using a security deposit based on a tokenized reputation score affiliated with the service provider account.

Although conventional reputation techniques satisfactorily address the challenges of the physical world, such techniques fail to address the technical challenges presented by the online world. Conventional techniques for controlling access to transactions also fail to address the technical challenges presented by the online world.

Conventional techniques for controlling access to transactions also enable and facilitate adverse outcomes. By way of example, online auctions often have accounts that place a winning offer on an item listing, but do not provide the compensation offered at the conclusion of the online auction. These disreputable accounts waste the time, labor, and opportunities of the account hosting the online auction and the other accounts participating in the online auction. These disreputable accounts also cause lost profits for the account hosting the online auction, especially when the value of an item being auctioned is time sensitive. Often, these disreputable accounts are new accounts that have not established any forms of reputation, such as feedback or reviews provided by other accounts. Other times, these disreputable accounts are throwaway accounts of either novice users that transact poorly due to inexperience, or disreputable users who do not have meaningful incentives to participate in online transactions in good faith.

Conventional techniques for controlling access to transactions often inefficiently require proactive, time-consuming, and manual labor by host accounts that host online transactions, such as to cancel bids of participant accounts, blocking participant accounts, etc. This inefficient labor includes research of profiles of participant accounts to make inferences of a participant account's trustworthiness. Examples of this research include identifying a negative feedback rating, negative reviews, an account age, an absence of a transaction history, and so forth. Accordingly, conventional techniques used to control access to transactions online enable and facilitate such adverse outcomes.

Conventional techniques for establishing reputation also facilitate the participation of disreputable users in online transactions. By way of example, accounts often transact online pseudonymously or anonymously, and rarely repeat interactions with other accounts. Further, listing items on the Internet is generally free and low effort, and users can easily discard accounts that are used for disreputable activities without repercussions. Overall, conventional techniques for establishing reputation and controlling access to transactions result in adverse outcomes such as damages, frustration, and inefficiency result for users and entities transacting online.

Conventional security deposit techniques also fail to adequately address challenges presented by online transactions. Generally, a conventional security deposit is provided as fiat currency and is intended to reimburse a host of a transaction (e.g., a landlord) in the event of damages or losses relevant to a transaction. Although conventional security deposits provide hosts of transactions with greater security, when a transaction associated with a conventional security deposit is unsuccessful, the provider of the safety deposit merely loses the security deposit provided, even when they transact in bad faith. Because of this, disreputable participants fail to receive a reputation cost. Because disreputable participants do not incur a reputation cost in view of conventional security deposit techniques, other hosts of transactions unknowingly continue to transact with disreputable participants. Additionally, conventional security deposit techniques to not properly disincentivize disreputable participants from transacting in bad faith, particularly via service provider systems, where reputation is becoming increasingly more valuable than currency. Conventional security deposit techniques also fail to disincentive disreputable participants that are wealthy. Accordingly, conventional security deposit techniques facilitate adverse outcomes for transactions online. Accordingly, conventional techniques for establishing reputability, controlling access to transactions, and using security deposits do not adequately address the technical challenges of the online world. Because these conventional techniques do not adequately address the technical challenges of the online world, adverse outcomes result. The adverse outcomes include inefficiency, inaccuracy, discrimination, inequity, inadequate security, and minimal utility.

Therefore, techniques are described, as implemented by computing devices, to control access to transactions through the use of security deposits based on tokenized reputation scores. The described techniques are performed by leveraging a blockchain such that tokenized reputation scores are obtained, generated, or calculated based on amounts of reputation tokens associated with blockchain account addresses associated with service provider accounts of a service provider system. The described techniques also make transactional functionality available to a service provider account based on the service provider account providing a security deposit of reputation tokens. Further, the described techniques control the return of a security deposit to a blockchain account address associated with a service provider account based on a determination of a successful or unsuccessful completion of a transaction.

In one example, a service provider system receives, from a service provider account, a request to participate in a transaction. A request can be submitted by a service provider account in various ways, such as in real time, via a prescheduled request, and so forth. A request can be received from via a variety of computing devices, including extended reality ("XR") devices (e.g., augmented reality devices, virtual reality devices, etc.), Internet of Things ("IoT") devices, laptop devices, desktop computers, mobile devices, and so forth. A request can also be input via a variety of ways, such as via oral input, physical touch, recognized gestures, and so forth.

The service provider system obtains a reputation score affiliated with a service provider account. As discussed throughout, the reputation score affiliated with the service provider account is generated based on an amount of reputation tokens associated with a blockchain account address associated with the service provider account. Reputation tokens are different from a reputation score, which is an interpretation (e.g., of reputation tokens) by a service provider system of a reputation of a service provider account.

Instead, reputation tokens are cryptographic tokens of a blockchain system that establish a reputation of a user having a private key of a blockchain account. In one example, the reputation tokens are fungible cryptographic utility tokens. The use of reputation tokens provides users with personal ownership over data relevant to their reputation. Personal ownership over data relevant to their reputation grants users with a universal reputation that is resistant to censorship, deletion, and tampering by third parties. Unlike conventional indications of reputability, such as review or feedback data owned by a service provider system, reputation tokens are not owned by the service provider system. This is because the described techniques are noncustodial, rather than custodial. Techniques for the obtaining reputation tokens, including the minting and transfer of reputation tokens, are discussed in further detail below regarding example system 200 of FIG. 2.

To continue this example, the service provider system generates a reputation score for the service provider account based on a blockchain account address or a blockchain account identifier associated with the service provider account. Tokenized reputation scores can be expressed in various ways, including as a normalized score, a ranking, a probability, a percentage, a fraction, a number, an emoji, or so forth. Tokenized reputation scores can also be expressed alphanumerically, symbolically, semantically, numerically, or so forth.

Additionally, or alternatively, the generation or calculation of the reputation score is based on transactional data of the blockchain account address associated with the service provider account. For instance, a longer length of a transactional history associated with a blockchain account address can result in a higher tokenized reputation score. In contrast, a shorter length of a transactional history of a blockchain account address can result in a lower tokenized reputation score.

The service provider system transmits a response specifying a security deposit to be transferred as a prerequisite to the service provider account being provided access to the transaction. For instance, a response is transmitted to a client device of the service provider account. By way of example, the service provider account can receive the response as a digital message, text message, notification, popup, email, digital content, or so forth. In one example, a response specifies an amount of reputation tokens to be transferred as a security deposit. The service provider system calculates the security deposit based on the reputation score affiliated with the service provider account. By way of example, a higher security deposit can be calculated based on a low tokenized reputation score. In contrast, a lower amount of reputation tokens (as the security deposit) can be calculated based on a high tokenized reputation score. In this example, the service provider system calculates a lower amount of reputation tokens because a service provider account that is predicted by a tokenized reputation score to be more trustworthy, predicts a higher likelihood of a transaction being successfully completed by the service provider account.

In one example, the security deposit is obtained through generation or calculation of the security deposit via the use of machine learning that "learns" based on past transactions and corresponding outcomes. Additionally, or alternatively, a security deposit is preset by a host service provider account that hosts a transaction. In this way, the host service provider account is empowered to customize the security deposits to their individual level of risk. In another example, a security deposit can be obtained for a service provider account based on an amount of risk predicted by the service provider system for a transaction. A newly created service provider account, for instance, can result in a higher amount of reputation tokens being specified as a security deposit. In contrast, a lower security deposit can be obtained for an established service provider account with a long-term history of transacting via the service provider system.

In one example, a security deposit is selected from a plurality of security deposits, each security deposit of the plurality of security deposits corresponding to a type of transaction. Some examples of types of transactions include luxury item transactions, auction transactions, fiat currency transactions, crypto transactions, instant purchase transactions, swapping transactions, rental transactions, borrowing transactions, NFT transactions, digital twin transactions, and so forth. By way of example, a luxury item transaction can correspond with a higher threshold score than a than a threshold score corresponding to a non-luxury item type of transaction. By way of additional example, a lower security deposit can be selected for an instant purchase transaction due to the generally predictable nature of simply purchasing a listed item. In contrast, a higher security deposit can be selected for an auction transaction due to the higher risk shouldered by host service accounts and other participant service provider accounts.

Additionally, or alternatively, a security deposit is generated based on an amount of currency involved in a transaction. In this example, a higher amount of currency (e.g., of cryptocurrency, fiat currency, property, or so forth) results in a calculation of a higher security deposit, whereas a lower amount of currency results in a calculation of a lower security deposit.

Further, the service provider system determines whether a transaction is permitted. In one example, the service provider system determines whether the transaction is permitted by monitoring for completion of a transfer of the security deposit. For instance, the completion of a transfer of the security deposit from a blockchain account address associated with the service provider account. In one example, the amount of reputation tokens transferred as the security deposit is locked via a smart contract of a blockchain system; the smart contract executes predetermined actions when predetermined conditions have been met and verified. By way of example, when a determination is made that a transaction is successfully completed, the security deposit can be returned to a blockchain account address without the friction and additional costs of a third-party intermediary.

To continue this implementation, the service provider system controls access to the service provider account to the transaction. In one example, the service provider system controls access to the service provider account to participate in the transaction. Additionally, or alternatively, a service provider system controls access responsive to monitoring a completion of a transfer of a security deposit. For instance, when the service provider system monitors that a transfer of a security deposit is complete, the service provider system responsively provides access to transactional functionality of the transaction to the service provider account. In one example, access to the transaction is communicated to a client device of a service provider system via a notification (e.g., a push notification, an SMS message, a digital message, a voice message, a popup notification). Access to participate in the transaction can also be communicated via other indications of the permitting of the transaction, such as changes of the digital content displayed via the user interface of the client device of the applicant service provider account. In one example, a predetermined or preselected user activity is executed automatically responsive to the determination that the transaction is permitted. For instance, a transactional action, such as placing a specified offer on a listed item of an auction transaction, can be automatically executed.

To continue this implementation, the service provider system updates a reputation score affiliated with a service provider account. The service provider system updates the reputation score based on detecting an updated amount of reputation tokens associated with a blockchain account address associated with the service provider account. For instance, responsive to a determination that a transfer of the security deposit is complete, the service provider system updates a reputation score affiliated with a service provider account.

In one example, the service provider system detects a successful transfer of a security deposit of reputation tokens from a blockchain account address associated with a service provider account. Accordingly, the service provider system updates the reputation score affiliated with the service provider account. Because the amount of reputation tokens associated with the blockchain account address is lower than before transferring the security deposit of reputation tokens, the service provider system determines an updated reputation score that is lower than the reputation score prior to the transfer.

As discussed throughout, a reputation score is an interpretation, by the service provider system, of a service provider account's reputability. Here, the reputation score is an interpretation of a service provider account's reputability based on cryptographic reputation tokens. Unlike conventional interpretations of reputation, such as a centralized form of a reputation score, reputation tokens are decentralized, and therefore resistant to censorship, deletion, and tampering. Therefore, due to the vulnerabilities inherent to centralized forms of data, the described techniques do not simply generate a reputation score. For these reasons, the described techniques rely on the decentralization of the cryptographic reputation tokens as the basis of the reputation scores. In one example, the service provider system displays an updated reputation score via a representation via a user interface. In another example, the service provider system updates a reputation score affiliated with a service provider account responsive to withholding from or returning a security deposit. In this manner, the tokenized reputation score of the service provider account is affected by its involvement in and fulfillment of a transaction that is contingent on the described security deposit techniques.

The service provider system determines a completion of a transaction. For instance, the service provider system determines a successful or unsuccessful completion of a transaction. By way of example, a service provider system determines an unsuccessful completion of an auction transaction when the service provider account places a winning bid of an auction transaction and fails to pay the amount of the winning bid. By way of another example, a service provider system determines a successful completion of an auction transaction when the service provider account places a winning bid of an auction transaction and pays the amount of the winning bid.

When the service provider system determines a successful completion of a transaction, the service provider system initiates a return of a security deposit. For instance, the service provider system initiates a return of the security deposit to a blockchain account address associated with the service provider account. In one example, the service provider system responsively initiates the distribution of the security deposit by triggering execution of a smart contract. Additionally, or alternatively, the distribution of the security deposit is from a contract address. In one example, the service provider system additionally transfers a reputation reward of reputation tokens to the blockchain account address associated with the service provider account responsive to a determination that the transaction was successfully completed.

On the contrary, when the service provider system determines an unsuccessful completion of a transaction, the service provider system withholds return of the security deposit. For example, the service provider system withholds return of the security deposit to the blockchain account address associated with the service provider account. Additionally, or alternatively, the service provider system initiates distribution of the security deposit to each blockchain account address associated with each service provider account participating in the transaction other than the service provider account. For instance, the security deposit provided by the service provider account is distributed equally among the other participating service provider accounts. As already described above, the service provider system can initiate the distribution of the security deposit by triggering execution of a smart contract. In this manner, the service provider system controls access of a service provider account to transactional functionality by using security deposit techniques based on tokenized reputation scores.

The described techniques also confer additional benefits. For example, the described techniques prevent friction at the service provider system by eliminating the need for third-party intermediaries that are often used by conventional techniques for establishing reputation, controlling access to transactions, and using security deposits. The described techniques also reduce unpredictability for service provider accounts due to the transparency provided by a blockchain system. By way of example, by leveraging a blockchain system, the movement of reputation tokens is transparent. The described techniques also improve the probability that host service provider accounts will host online transactions via the service provider system. The described techniques improve the probability because the described techniques deter noncommittal or disreputable service provider accounts from participating in a transaction by using security deposits based tokenized reputation scores. Further, the decentralized design of reputation tokens of a blockchain system confers superior security over centralized systems and data and provides cross-platform compatibility. Because blockchains are decentralized and distributed across peer-to-peer networks that are continuously updated and kept in sync, and not centralized, it is substantially difficult to tamper with data stored on a blockchain (e.g., reputation tokens). The data of the reputation tokens of a blockchain are further secured through cryptography.

Moreover, because the holder of a private key associated with a blockchain account has personal ownership over reputation tokens associated with the blockchain account, the owner of the reputation tokens is empowered. By way of example, the holder of the private key can evidence their universal reputation by mapping the blockchain account address of the blockchain account to different service provider accounts of different service provider systems. Thus, the described techniques enable owners of reputation tokens to unlock additional functionality provided by other service provider systems. The described techniques also enable owners of reputation tokens to use their decentralized reputation in other parts of their life.

Further discussion of these and other examples is included in the following sections and shown in corresponding figures. In the following discussion, an example blockchain environment is described that employs the techniques described herein. Example procedures are also described that are performable in the example environment as well as other environments. Consequently, performance of the example procedures is not limited to the example environment and the example environment is not limited to performance of the example procedures.

Example Environment

FIG. 1 is an illustration of a blockchain environment 100 in an example implementation that is operable to employ techniques described herein. The blockchain environment 100 includes a blockchain system 102, a service provider system 104, and a client device 106 that are communicatively coupled, one to another, via a network 108. In one example, the blockchain environment 100 further includes an oracle and a distributed storage that are also communicatively coupled, one to another, via the network 108 with the blockchain system 102, the service provider system 104, and a client device 106.

Computing devices that implement the blockchain environment 100 are configurable in a variety of ways. A computing device, for instance, is configurable as a desktop computer, a laptop computer, a mobile device (e.g., assuming a handheld configuration such as a tablet or mobile phone), an IoT device, a wearable device, an XR device, a server, and so forth. Thus, a computing device ranges from full resource devices with substantial memory and processor resources to low-resource devices with limited memory and/or processing resources. Additionally, although in instances in the following discussion reference is made to a computing device in the singular, a computing device is also representative of a plurality of different devices, such as multiple servers of a server farm utilized to perform operations "over the cloud" as further described in relation to FIG. 9.

The blockchain system 102 is implemented by a plurality of nodes 110. Nodes 110 are a runtime implemented using processing, memory, and network resources of respective computing devices 112 that operate as the infrastructure of the blockchain 114. As part of this, the nodes 110 store, communicate, process, and manage data that makes up the blockchain 114. Nodes 110 are interconnected as illustrated in FIG. 1 to exchange data via the network 108, e.g., as a peer-to-peer network in a distributed and decentralized manner.

The blockchain 114 is formed using a plurality of blocks 116, illustrated in FIG. 1 as including respective block identifiers (IDs) 118 and transaction data 120. Transaction data 120 of the blocks 116 includes batches of validated transactions that are hashed and encoded. Each block 116 includes a cryptographic hash of a prior block 116 in the blockchain 114, thereby linking the blocks 116 to each other to form the blockchain 114. As a result, the blocks 116 cannot be altered retroactively without altering each subsequent block 116 in the blockchain 114 and in this way protects against attacks by malicious parties.

In order to generate the blocks 116 for addition to the blockchain 114, a node 110 is implemented as a "miner" to add a block of transactions to the blockchain 114. The other nodes 110 of the blockchain system 102 then check if the block of transactions is valid, and based on this, determine whether to accept or reject this data. If valid, the block of transactions is stored as transaction data 120 along with a block ID 118 for a respective block 116, e.g., is stored "at the end" or "at the top" of the blockchain 114 along with a hash of a previous block in the chain. The nodes 110 then broadcast this transaction history via the network 108 for sharing with other nodes 110. This acts to synchronize the blocks 116 of the blockchain 114 across the distributed architecture of the blockchain system 102. Other types of nodes 110 are also included as part of the blockchain system 102. In one such example, full nodes are nodes that store an entirety of the blockchain 114, e.g., locally in computer-readable storage media of a respective storage device. Other types of nodes are also employed to implement additional functionality to govern voting events, execution of protocol operations, rules enforcement, and so forth.

The blockchain system 102 implements a virtual machine 122 that is representative of a diverse range of functionality made possible by leveraging the blockchain 114. In a first such example, the virtual machine 122 implements a distributed ledger 124 of accounts 126 and associated balances 128 of those accounts 126. Distributed ledgers 124 support secure transfer of digital assets (e.g., tokens or coins of cryptocurrencies) between accounts 126 without management by a central authority through storage as part of the transaction data 120 of the blockchain 114. Through synchronized and distributed access supported by the blockchain 114 as described above, changes to balances 128 (e.g., a number of tokens) are visible to any entity with access to the blockchain 114. Techniques are also implemented to support management of the balances 128 across the accounts 126, e.g., to enforce rules that a respective account 126 does not transfer more coins than are available based on a balance 128 specified for that account 126.

In another example, the virtual machine 122 implements a distributed state machine 130 that supports application 132 execution. The distributed state machine 130 is implemented along with the transaction data 120 within the blocks 116 of the blockchain 114 such that the blocks describe accounts and balances as described above for the distributed ledger 124. The transaction data 120 also supports a machine state, which can change from block to block of the blockchain 114. In one example, the application 132 is executable as part of a "Turing-complete" decentralized virtual machine that is distributed across the nodes 110 of the blockchain system 102. As Turning-complete, the application 132 is computationally universal to perform computing device operations, e.g., logic or computing functions. Thus, the application 132 is executable by a processing system of a computing device as software that is storable in a computer-readable storage media of the nodes 110 to perform a variety of operations.

An example of an application 132 that is executable as part of the distributed state machine 130 is a smart contract 134. A smart contract 134 is executable automatically and without user intervention (or with partial human interaction as inputs when desired) by the nodes 110 of the distributed state machine 130. Execution of the smart contract 134 includes obtaining data from a specified data source (e.g., devices, APIs, and so forth that are accessible via the network 108), and based on this data, initiating one or more operations based on conditions described in the smart contract 134. In one or more examples, the smart contract 134 is a type of account 126 that includes a balance 128 and initiates transactions based on conditions specified by the smart contract 134, e.g., to support automated escrow and other functionalities. A variety of other examples are also contemplated that support implementation of any executable operation by a computing device using software.

Cryptocurrencies (e.g., coins of the cryptocurrency) are a native asset of the blockchain 114, and tokens are created "on top" of these blockchains. Cryptocurrencies allow individuals to make payments using their digital currency. Individuals can use tokens, however, for other purposes. By way of example, individuals can use tokens for trading, to hold and store value, and so forth. Some examples of types of tokens include utility tokens, governance tokens, security tokens, and non-fungible tokens (NFTs). Utility tokens, for example, provide an owner of the token with access to a blockchain-based product or service.

In an additional example of a token, the smart contracts 134 may, for example, implement NFTs. NFTs include digital assets that are provably unique and as such cannot be duplicated or divided. As such, NFTs are not exchanged as having a same value as coins in cryptocurrency, but rather are digital assets having identifying information recorded as part of the smart contract 134. This identifying information is immutably recorded on that token's blockchain 114 and thus ownership of the token is also recorded and tracked. A variety of information is storable as part of the digital content represented by the NFT. Examples of information that is storable include digital content, executable instructions of an application 132 as described above, secure file links, in-game tokens, digital artwork, and so forth. Other examples of tokens are also contemplated that are fungible and as such are interchangeable with each other.

The client device 106 includes a client blockchain module 136 that is representative of functionality of the client device 106 to interact with the blockchain system 102. An example of this functionality includes management of a crypto wallet 138, e.g., in local storage device 140. The crypto wallet 138 stores public and private cryptographic keys in this example that are used to support interaction with the blockchain system 102, and more particularly respective accounts 126 of the blockchain system 102, via a user interface 142.

The public key supports transactions to an address of the account 126 derived from the public key, which are stored as part of the blockchain 114 to memorialize the transaction as part of transaction data 120. In one example, an address of an account 126 is generated by first generating a private key, e.g., using a randomization technique. The corresponding public key is derived from the private key and the address of the account 126 is then derived from the public key, e.g., as an entirety of the public key or as a shortened version of the public key. The private key is used to "unlock" transactions that are "locked" by the public key and gain access to the account 126, e.g., access to coins, tokens or other information maintained as part of the transaction.

The blockchain environment 100 also includes a service provider system 104 implementing a service platform 144 of digital services 146, illustrated as maintained in a storage device 148 and are executable via a processing system. Digital services 146 involve electronic delivery of data and implementation of data functionality by computing devices to support a range of computing device operations. Digital services 146, for instance, include creation, management, and dissemination of digital content via the network 108, e.g., webpages, applications, digital images, digital audio, digital video, and so forth. The digital services 146 are also implemented to control access to and transfer of physical goods and services through corresponding digital content, e.g., sales, product listings, advertisements, etc. Digital services 146 further pertain to operation of computational resources (e.g., processing, memory, and network resources) of computing devices that support the access to and management of the digital content by the system.

Functionality of the client device 106 to access the digital services 146 of the service provider system 104 is represented by respective client service module 150. The client service module 150 is configurable as a browser, network-enabled applications, third-party plugins, and so on to access the digital services 146 via the network 108.

The service provider system 104 also includes a reputation manager module 152. The reputation manager module 152 is configured to, via a blockchain interaction manager module 154, manage the transfer of reputation tokens through use of an application 132 generated by the service provider system 104 and executed by the distributed state machine 130. The service platform 144, for instance, includes a digital service 146 configured to support transactions of items, e.g., physical items or digital content, using service provider accounts. Transferring reputation tokens may be initiated by the service platform 144, responsive to a transaction, based on a reputation reward calculated based on data describing the transaction. The blockchain interaction manager module 154 of the reputation manager module 152, for instance, initiates, via the blockchain system 102, a transfer ownership of reputation tokens to a blockchain account 126 as part of the blockchain 114, ownership of which is associated with a blockchain account 126 of a participant of the transaction. In this way, execution of the application 132 provides an ability of the service provider system 104 to communicate further with the client device 106.

The service provider system 104 also includes an access control module 230. The access control module 230 is configured to control access of service provider accounts to transactions. For instance, if a determination is made that a transaction is to be denied for a service provider account, the access control module 230 may prevent the transaction.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combinable in different ways. Thus, individual functionality, features, and concepts described in relation to different example environments, devices, components, figures, and procedures herein are usable in any suitable combinations and are not limited to the particular combinations represented by the enumerated examples in this description.

Cosigning Based on Tokenized Reputation Scores

Figure 3:
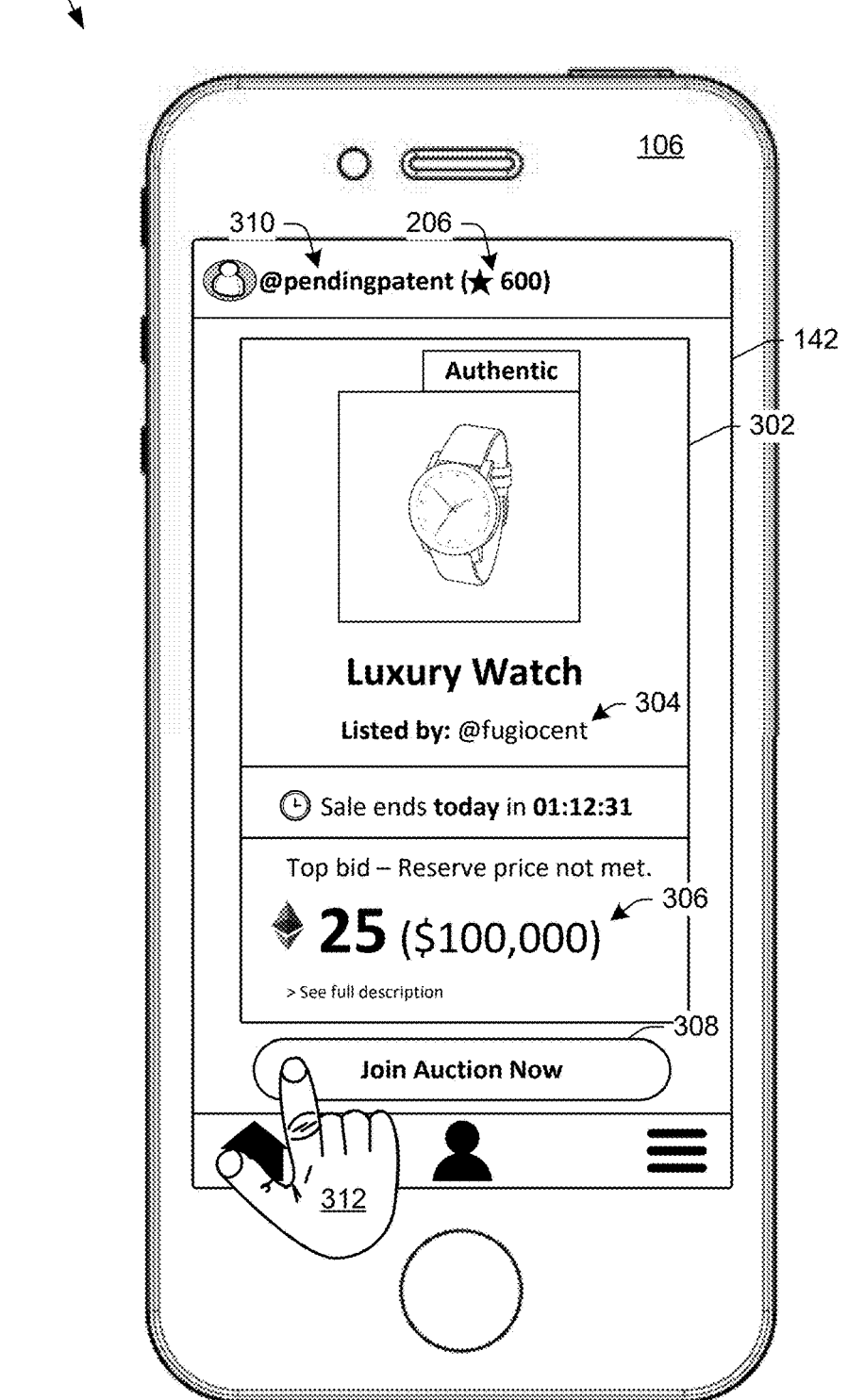
FIG. 3 depicts an example implementation of a user interface of a client device depicting a request to participate in a transaction using a service provider account.
Figure 4:
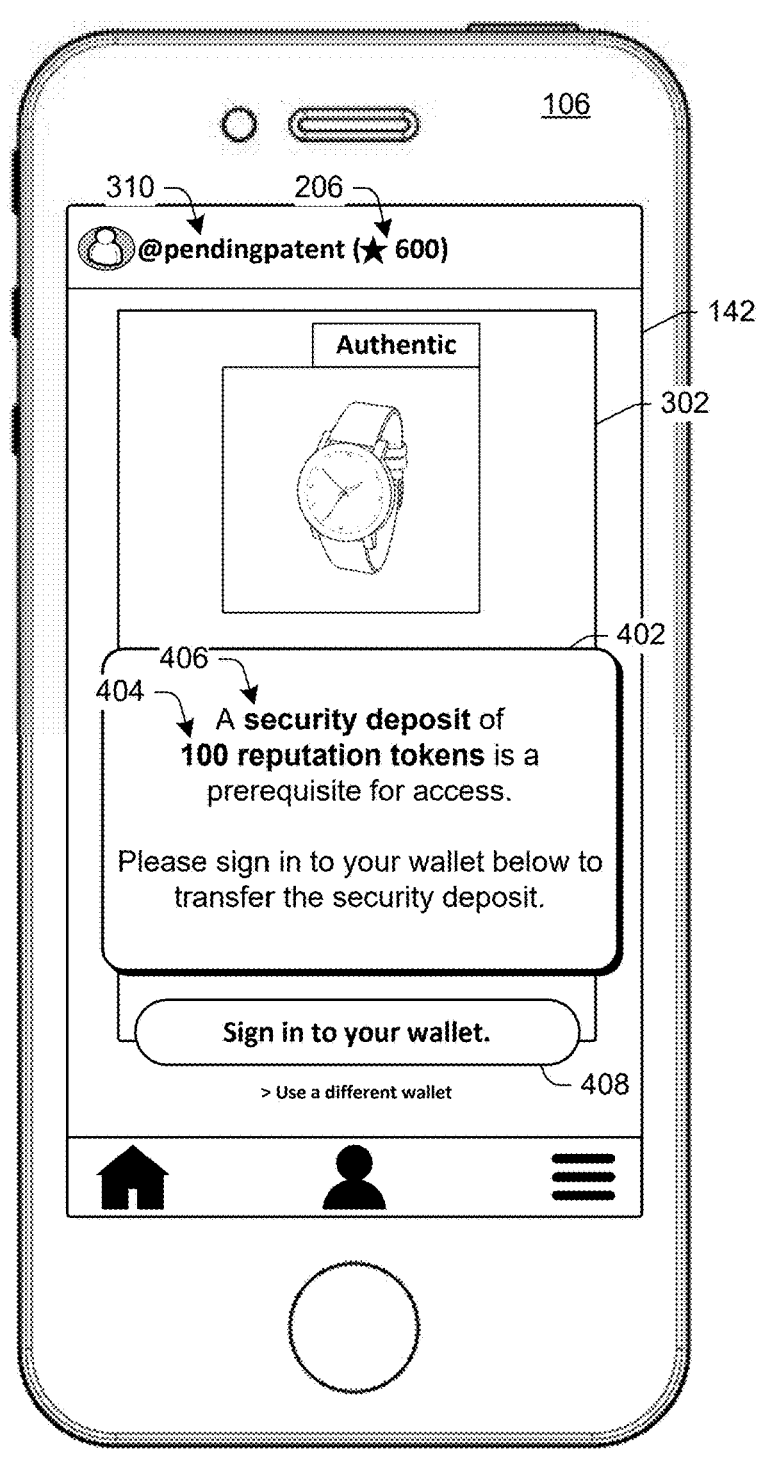
FIG. 4 depicts an example implementation of a user interface of a client device depicting a response specifying an amount of reputation tokens as a security deposit for the service provider account to participate in a transaction.
Figure 5:
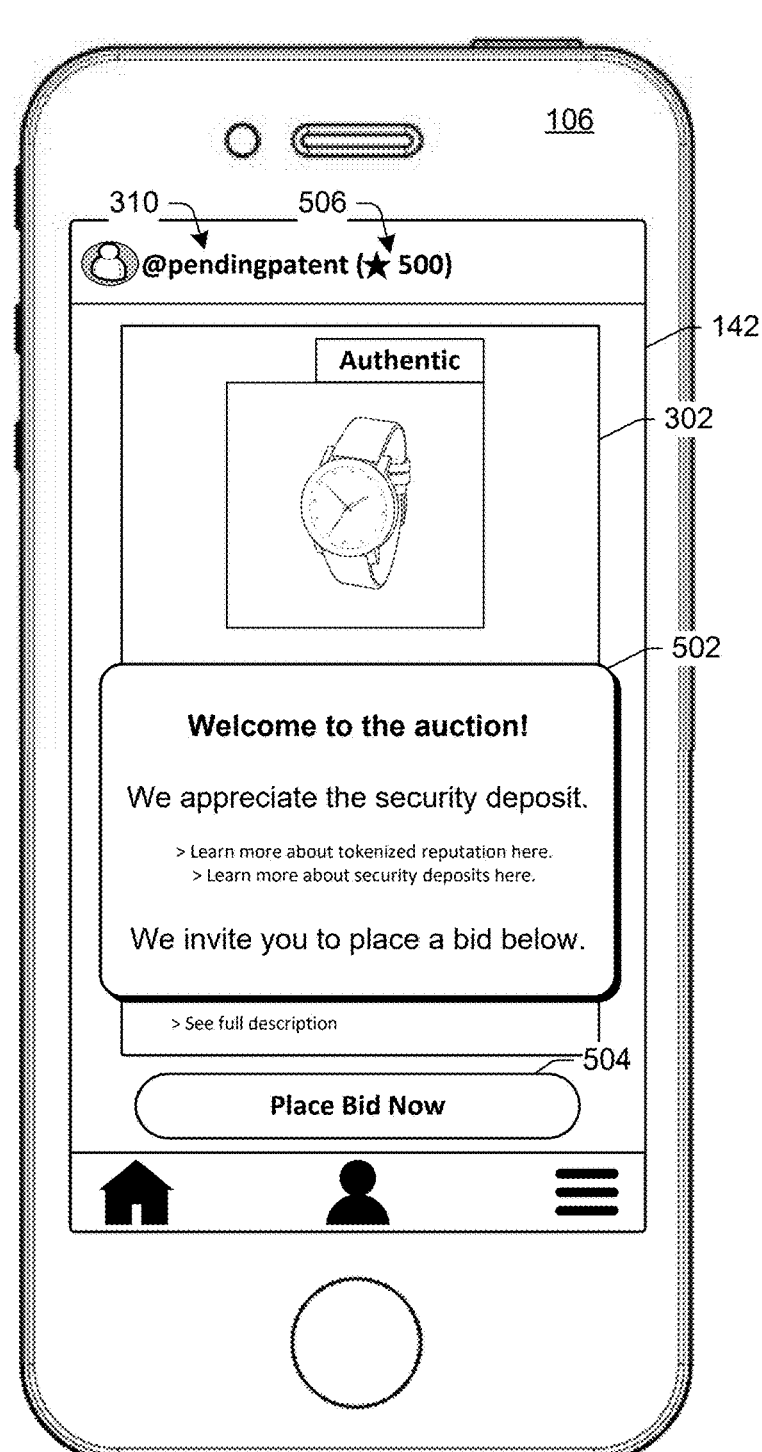
FIG. 5 depicts an example implementation of a user interface of a client device depicting providing access to a service provider account to participate in a transaction based on a completed transfer of a security deposit of cryptographic reputation tokens.
Figure 6:
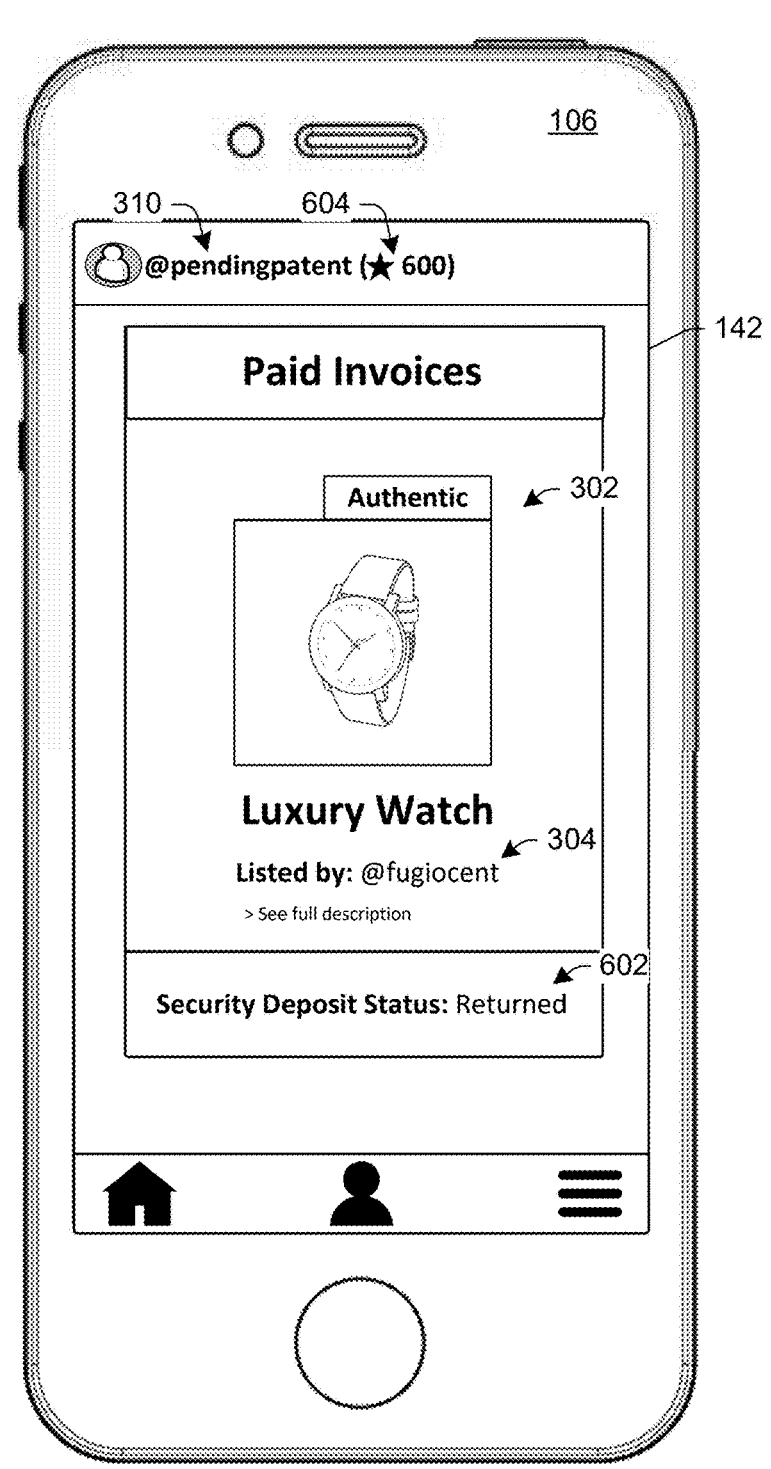
FIG. 6 depicts an example implementation of a user interface of a client device depicting a successful completion of a transaction, where a security deposit of the transaction is returned to a blockchain account address associated with a service provider account.
Figure 7:
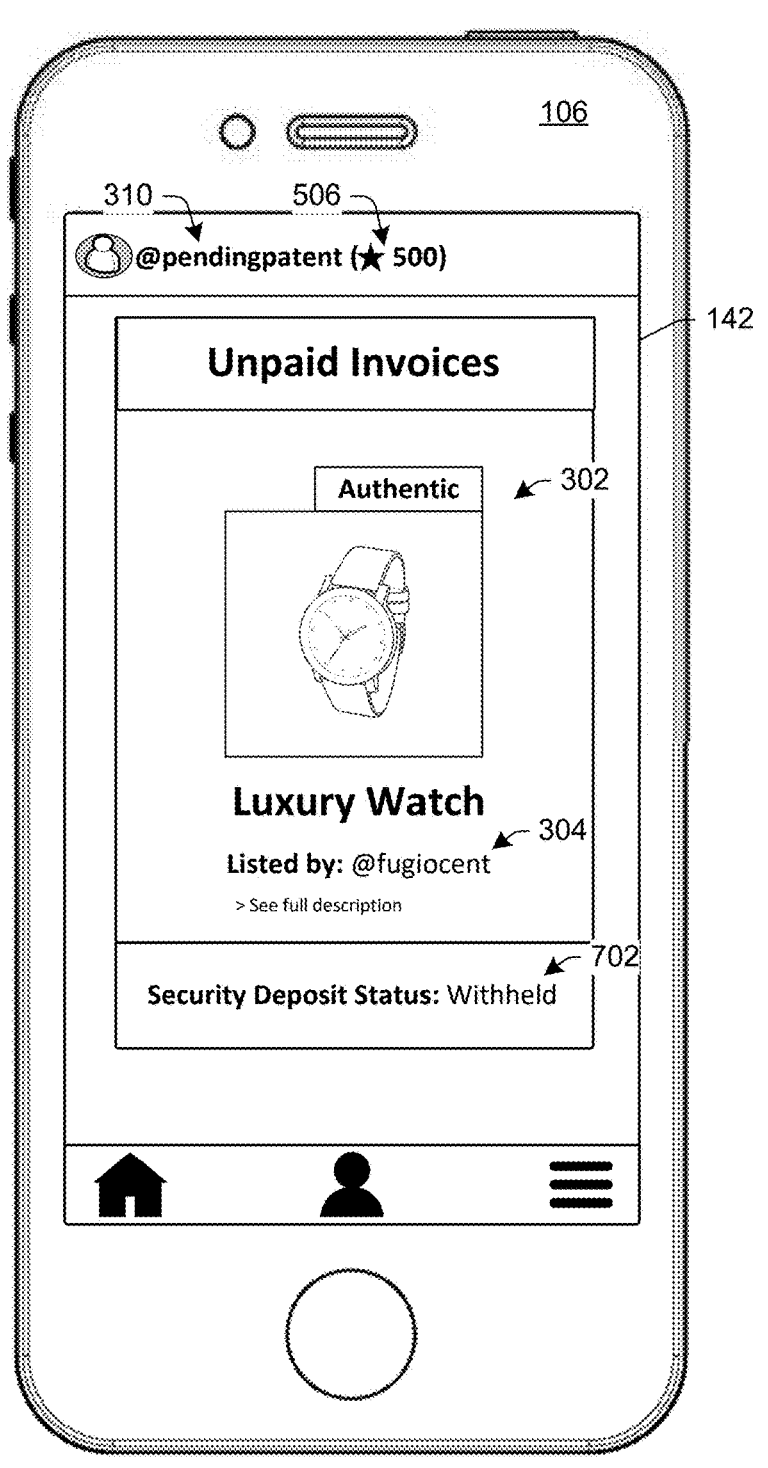
FIG. 7 depicts an example implementation of a user interface of a client device depicting an unsuccessful completion of a transaction, where a security deposit of the transaction is withheld from a blockchain account address associated with a service provider account.

FIG. 2 depicts an example system showing operation of a service platform of a service provider system of FIG. 1 in greater detail as controlling access of a service provider account to a transaction using a security deposit based on a tokenized reputation score affiliated with the service provider account. FIG. 3 depicts an example implementation of a user interface of a client device depicting a request to participate in a transaction using a service provider account. FIG. 4 depicts an example implementation of a user interface of a client device depicting a response specifying an amount of reputation tokens as a security deposit for the service provider account to participate in a transaction. FIG. 5 depicts an example implementation of a user interface of a client device depicting providing access to a service provider account to participate in a transaction based on a completed transfer of a security deposit of reputation tokens. FIG. 6 depicts an example implementation of a user interface of a client device depicting a successful completion of a transaction, where a security deposit of reputation tokens of the transaction is returned to a blockchain account address associated with a service provider account. FIG. 7 depicts an example implementation of a user interface of a client device depicting an unsuccessful completion of a transaction, where return of a security deposit of reputation tokens of the transaction is withheld from a blockchain account address associated with a service provider account. FIG. 8 is a flow diagram depicting a procedure 800 in an example implementation of security deposit techniques using tokenized reputation scores.

The following discussion describes techniques that are implementable utilizing the previously described systems and devices. Aspects of each of the procedures are implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-8.

To begin in the illustrated example of FIG. 2, a service provider system 104 includes a service platform 144 having a reputation manager module 152, a transaction manager module 156, and a storage device 148. The service platform 144 supports user interaction via client devices (e.g., client device 106), such as transactions, by implementing digital services 146. The digital services 146 are executable to initiate transfer of ownership and/or possession of an item to or from client devices (e.g., client device 106), blockchain accounts (e.g., blockchain account 126), and so forth.

The reputation manager module 152 manages processes relevant to tokenized reputation of service provider accounts 202 (e.g., service provider account 204) of the service provider system 104. Examples of these processes include generation of reputation scores (e.g., reputation score 206), receipt of reputation token data 208 of reputation tokens 210 from a blockchain system 102, and so forth. The reputation manager module 152 includes a blockchain interaction manager module 154, which the reputation manager module 152 uses to interact with blockchain system 102. For instance, the blockchain interaction manager module 154 retrieves the reputation token data 208 of reputation tokens 210 for a blockchain account 126, which is used to generate a reputation score 206 for service provider account 204.

The transaction manager module 156 is configured to manage processes relevant to transactional functionality for service provider accounts 202 of the service provider system 104, such as access control using safety deposits based on reputation scores (e.g., reputation score 206) of service provider accounts 202.

The storage device 148 includes the service provider accounts 202, including service provider account 204 having blockchain account data 212 having a blockchain account address 214 associated with the service provider account 204. The storage device 148 can also include other types of data, such as a service provider account identifiers, transactional data, and so forth.

In system 200, the reputation manager module 152 includes functionality to generate a reputation score 206 affiliated with the service provider account 204 associated with the blockchain account address 214. In one example, the reputation score 206 is obtained, generated, or calculated based at least in part on an amount of reputation tokens 210 associated with the blockchain account address 214 of blockchain account 126.

As discussed throughout, reputation tokens 210 are cryptographic tokens of a blockchain system 102 that establish a reputation of a user having a private key of a blockchain account 126. In one example, the reputation tokens 210 are fungible cryptographic utility tokens. Reputation tokens 210 are usable to establish a reputation with or without a service provider system's 104 interpretation of the reputation tokens 210: for instance, as a reputation score 206. The use of reputation tokens 210 provides users with personal ownership over data relevant to their reputation. Accordingly, the use of reputation tokens 210 grants users with a universal reputation that is resistant to censorship, deletion, and tampering by third parties. Unlike conventional indications of reputability, such as review or feedback data owned by a service provider system 104, reputation tokens 210 are not owned by the service provider system 104. The reputation tokens 210 are not owned by the service provider system 104 because the described techniques are non-custodial, rather than custodial.

In short, the service provider system 104 does not own an amount of reputation tokens 210 associated with a blockchain account address 214. Instead, a user with a private key associated with a blockchain account address 214 associated with the amount of reputation tokens 210 has ownership of the amount of reputation tokens 210. Through personal ownership, users are more empowered to evidence their universal reputation outside of the service provider system 104. For instance, among a plurality of service provider systems 104, among a plurality of governments, or so forth.

Moreover, reputation tokens 210 associated with a blockchain account address 214 are resistant to tampering or deletion by parties without an associated private key because the reputation tokens 210 are recorded via a decentralized system instead of a centralized system, and are additionally secured via cryptography. In contrast, data owned by a centralized system (e.g., a centralized service provider system 104) is vulnerable to tampering, deletion, breaches, and other adverse outcomes.

In this way, reputation tokens 210 are used as the central mechanism of establishing a decentralized reputation, instead of simply generating centralized reputation data. Unlike conventionally centralized reputation data, reputation tokens 210 of a blockchain system 102 are decentralized, and therefore are difficult to tamper with, censor, corrupt, or delete. Therefore, due to the vulnerabilities inherent to centralized forms of data, the described techniques do not simply generate a reputation score 206. For the forgoing reasons, the described techniques leverage reputation tokens 210, which are reinterpreted by a service provider system 104 as a reputation score 206.

Users obtain reputation tokens 210 in various ways. In one example, a service provider system 104 receives data describing user activity associated with a service provider account 204. The service provider system 104 determines whether the user activity is eligible for a reputation reward, and if so, the service provider system 104 invokes a smart contract 134 of a blockchain system 102. By invoking the smart contract 134, the service provider system 104 initiates, via the smart contract 134, a calculation of an amount of reputation tokens 210 to be minted and/or transferred as a reputation reward. In one example, the smart contract 134 orchestrates a computation of the reputation reward with an oracle that is configured to execute an algorithm to compute the reputation reward based on the user activity of the service provider account 204.

Oracles provide trustless (or near-trustless) ways of obtaining off-chain information, such as the distributed storage data of a distributed storage, for the use of smart contracts 134 of a blockchain system 102. Oracles also directly relay data securely to decentralized application frontends. In summary, oracles are a mechanism for bridging the gap between off-chain systems (e.g., service provider system 104) and on-chain smart contracts 134. Oracles provide a few key functions, including the ability to collect data from an off-chain source, transfer the data on-chain with a signed message, and make the data available by putting it in a smart contract's 134 storage.

Once the data is available in smart contract's 134 storage, other smart contracts 134 can access the data via message calls that invoke a retrieve function of the oracle's smart contract 134. The data can also be accessed by nodes 110 of a blockchain system 102 or network-enabled clients directly by inspecting an oracle's storage. In this example, the oracle provides a reputation reward of reputation tokens 210 that is computed to be transferred to a service provider account 204 based on user activity data. The oracle is configured to execute an algorithm configured to compute the reputation reward based on the user activity data.

The user activity of the service provider account 204 can be obtained from an off-chain distributed storage by the oracle. In one example, the distributed storage includes distributed storage data. The distributed storage data includes data received from one or more service provider systems 104, such as the user activity data or the request data 226. In one example, the distributed storage is a distributed public storage. In this manner, the distributed storage data of the distributed storage is transparent to participants of the system 200, such as one or more service provider systems 104, at least regarding blockchain account identifiers or blockchain account addresses 214.

It is advantageous to store data via a distributed storage because the full replication of blocks 120 of a blockchain 116 across the nodes 110 of the blockchain system 102 has limited storage capacity and limited scalability in comparison to using a distributed storage. Storing large amounts of data within a transaction via a blockchain system 102 is challenged by the limited size of the transaction and blocks 120 of the blockchain 116. For example, Ethereum has a block 120 gas limit to determine the number, computational complexity, and data size of the transactions included in a block 120. Data cannot take advantage of the immutability or integrity guarantees without being stored on the blockchain 116. The use of an off-chain distributed storage addresses these issues while ensuring that any given service provider system 104 does not have direct control over the distributed storage, and therefore cannot abuse the distributed storage. Notably, "off-chain" does not necessarily mean not on a blockchain 116.

In one example, the user activity data is normalized data. Data normalization reduces a number of anomalies that complicate data analysis. Anomalies can occur from deleting data, inserting more information, or updating existing information. Data normalization enables increased efficiency and use of the user activity data. Normalized data also consumes less space, increases technical performance, and removes redundancies. In one example, the user activity data is passed per a uniform standard that is agreed upon amongst one or more participating service provider systems 104. The user activity data from the service provider system 104 can be stored as part of the distributed storage data by the distributed storage.

To continue this example, responsive to computation of the reputation reward, the smart contract 134 mints and/or transfers the amount of reputation tokens 210 as a reputation reward to a blockchain account address 214 associated with the service provider account 204. In this manner, the smart contracts 134 of the blockchain system 102, especially if in concert with an oracle and a distributed storage, are used by the service provider system 104 to calculate a reputation reward of reputation tokens 210 with consistency and transparency. The described techniques also result in a reduction of on-chain computation or storage needs, which can thus scale independently. The described techniques ensure the integrity of the minting and transfer of reputation tokens 210, which is importantly designed to protect against abuse from a service provider system 104.

The described techniques also provide consistency to the computation of reputation tokens 210, because different service provider systems 104 can have different computation techniques for calculating an amount of reputation tokens 210 to transfer as a reputation reward. Moreover, the use of oracles, a distributed storage, and smart contracts 134 provides transparency to all participants, including service provider systems 104 and service provider accounts 202. The described techniques also improve the cost efficiency involved with 'gas' affiliated with on-chain transactions, while addressing the limitations of on-chain storage limitations.

It is to be appreciated that the described calculation, minting, and transferring techniques of reputation tokens 210 do not preclude an independent reputation token management layer of a service provider system 104. In another example, a service provider system 104 receives data describing user activity associated with a service provider account 204 of the service provider system 104. The service provider system 104 determines whether the user activity is eligible for a reputation reward, and if so, the service provider system 104 calculates the reputation reward based on the data describing the user activity. Further, the service provider system 104 initiates a transfer of reputation tokens 210 to a blockchain account address 214 associated with the service provider account 204 based on the reputation reward. The transfer of the reputation tokens 210 can be from an exchange, a wallet provider, a contract address, an external account address, or so forth.

Additionally, or alternatively, the reputation manager module 152 generates the reputation score 206 based at least in part on transaction data associated with blockchain account address 214 of blockchain account 126. The service provider system 104 determines the amount of reputation tokens 210 associated with the blockchain account address 214 of the blockchain account 126 in various ways. By way of example, the service provider system 104 determines the amount of reputation tokens 210 via receipt of reputation token data 208 from the blockchain system 102.

In one example, the reputation manager module 152 generates the reputation score 206 based additionally or alternatively on NFTs associated with the blockchain account address 214 associated with the service provider account 204. By way of example, NFTs representing reputability (e.g., a verified identity, verified or verifiable credentials, etc.) result in the generation of a higher tokenized reputation score 206. For instance, an NFT representing verified credentials (e.g., from a service provider system 104, a government agency, a credit agency, or so forth) associated with the blockchain account address 214 associated with the service provider account 204 can be used to generate a tokenized reputation score 206.

In the illustrated example, the transaction manager module 156 of the service provider system 104 receives request data 216 to perform a transaction (block 802). In one example, the transaction manager module 156 receives request data 216 from a service provider account 204 to participate in a transaction, such as to place an offer on a listed item. The transaction manager module 156 is configured to receive the request data 216 from various types of computing devices, such as client device 106. In one example, the transaction manager module 156 receives the request data 216 via user input from a client device 106 of the service provider account 204. A variety of types of transactions are contemplated, including but not limited to auction transactions, NFT transactions, digital twin transactions, swapping transactions, sale transactions, purchase transactions, rental transactions, borrowing transactions, and so forth.

The service provider system 104 is configured to, via a reputation management module 218, obtain or determine the reputation score 206 affiliated with service provider account 204. The reputation management module 218 determines the reputation score 206 for service provider account 204 based on an amount of reputation tokens 210 associated with the blockchain account address 214 associated with the service provider account 204 (block 804). Notably, the service provider system 104 determines the amount of reputation tokens 210 via various ways. For instance, the blockchain interaction manager module 154 is configured to receive reputation token data 208 from the blockchain system 102. In one example, the blockchain interaction manager module 154 automatically receives reputation token data 208 from the blockchain system 102 (e.g., via a smart contract 134 or an application 132) at predefined intervals, responsive to a predefined condition being met.

Alternatively, or additionally, the service provider system 104 generates a reputation score 206 affiliated with a service provider account 204 associated with a blockchain account identifier (e.g., an Ethereum Name Service domain name, a Coinbase Wallet username, and so forth) instead of a blockchain account address 214, where the blockchain account identifier is associated with the blockchain account address 214. By way of example, the blockchain account identifier can be mapped to a blockchain account address 214 that is associated with a service provider account 204.

As shown in FIG. 2, the security deposit manager module 220 receives the reputation score 206 from the reputation management module 218. The security deposit manager module 220 is configured to transmit a response 222 specifying a second amount of reputation tokens to be transferred as a safety deposit for the service provider account 204 to participate in the transaction (block 806). The security deposit manager module 220 has additional functionality to determine, obtain, generate, or calculate the second amount of reputation tokens to be specified as the security deposit associated with the transaction.

In one example, the security deposit manager module 220 calculates the security deposit based on the reputation score 206 affiliated with the service provider account 204. A lower reputation score 206, for instance, can result in a higher security deposit in comparison to a higher reputation score 206 being affiliated with a service provider account 204. In this example, the reputation manager module 152 calculates a higher security deposit because a lower tokenized reputation score 206 substantially predicts a higher likelihood of the service provider account 204 unsuccessfully completing a transaction. In at least some instances, the security deposit is selected from a plurality of security deposits, each security deposit of the plurality of security deposits corresponding to a type of transaction.

The security deposit manager module 220 also includes functionality to obtain or calculate the security deposit amount based on an amount of currency (e.g., fiat currency, cryptocurrency, etc.) involved in a transaction. It is to be appreciated that the security deposit manager module 220 can obtain, calculate, or generate a security deposit amount based on any number of factors, such as a threshold severity, a threshold risk, or so forth. The security deposit can be predetermined or preselected by a host service provider account that is hosting the requested transaction. In this way, host service provider accounts customize the degree of risk, with which, they are comfortable while hosting listings online via the service provider system 104 or the service platform 144. After the security deposit manager module 220 obtains the security deposit amount to be specified, the security deposit manager module 220 transmits the security deposit amount specified via the response data 222. In one example, the client device 106 of the service provider account 204 receives the response data 222.

To continue this example, a security deposit monitoring module 224 is configured to determine whether the transaction is permitted. The security deposit monitoring module 224 determines whether the transaction is permitted by monitoring for completion of a transfer of the security deposit from the blockchain account address 214 associated with the service provider account 204 (block 808). Specifically, the security deposit monitoring module 224 monitors security deposit data 226 received from the blockchain interaction manager module 154. The amount of reputation tokens transferred as the security deposit can be locked up by a smart contract 134 that is executed via the blockchain system 102, such as at a contract address.

Based on monitoring a completion of a transfer of the security deposit, the security deposit monitoring module 224 passes determination data 228 to an access control module 230. The determination data 228 includes a determination that the transaction is permitted based on a monitored completion of a transfer of a security deposit. The access control module 230 of the service provider system 104 is configured to control access to the service provider account to participate in the transaction (block 810). In this example illustration, responsive to receiving the determination data 228, the access control module 230 provides access to the service provider account 204 to participate in the transaction. The access control module 230 of the service provider system 104 is indicative of functionality to manage access control of the service provider accounts 202 of the service provider system 104. In one example, the access control module 230 passes access data 232 to the client device 106 of the service provider account 204 to permit the transaction. The access data 232 can include various types of data, an example of which is data for a displayable indication (e.g., a notification) that the transaction is permitted. The displayable indication of the access data 232, for instance, can overlay an item page for the transaction.

The transaction monitoring module 234 is configured to monitor the successful or unsuccessful completion of transactions. In this example illustration, the transaction monitoring module 234 monitors transactional data 236 of the transactions to monitor for completion. The transaction monitoring module 234 determines a successful completion of a transaction. In another example, the transaction monitoring module 234 determines an unsuccessful completion of a transaction. The transaction monitoring module 234 passes the determination of the type of completion (e.g., successful, unsuccessful, etc.) as completion data 238 to a security deposit controller module 240.

The security deposit controller module 240 of the service provider system 104 has functionality to control the security deposit that was originally provided by the service provider account 204. By way of example, the security deposit controller module 240 is configured to initiate a return of a security deposit, initiate a distribution of a security deposit, or withhold return of a security deposit. In one example, responsive to receiving completion data 238 indicating successful completion of a transaction, the security deposit controller module 240 initiates a return of the security deposit. In this example, the return of the security deposit is to the blockchain account address 214 associated with the service provider account 204.

In another example, responsive to receiving completion data 238 including a determination of an unsuccessful completion, the security deposit controller module 240 withholds return of the security deposit to the blockchain account address 214 associated with the service provider account 204. Additionally, or alternatively, the security deposit controller module 240 initiates distribution of the security deposit with other participating service provider accounts 202 other than the service provider account 204 via each respective blockchain account address associated with the other participating service provider accounts 202. Further, the security deposit controller module 240 initiates distribution of the security deposit with one or more host service provider accounts 202 that hosted the transaction. In instances where the distribution of the security deposit is initiated, the security deposit can be evenly divided among the different service provider accounts 202, such as the other participating service provider accounts 202 or the one or more host service provider accounts 202 of the transaction. The security deposit controller module 240 passes the instructions to control the movement of the security deposit to the blockchain interaction manager module 154 as security deposit control data 242.

To continue an earlier example, a security deposit of an amount of reputation tokens that is locked up via a smart contract 134 can be automatically released responsive to a predefined condition being met and transferred to one or more blockchain account addresses. In one example, the automatic release and transfer occurs responsive to determining a successful completion of the transaction. In another example, an automatic release and distribution occurs responsive to determining an unsuccessful completion of the transaction. By leveraging a smart contract 134 of the blockchain system 102, the reputation tokens are conferred greater security because of the many nodes 110 that comprise the blockchain system 102. On the contrary, data that is maintained by a centralized system is vulnerable to internal actors of the service provider system 104 (e.g., tampering) and other types of security breaches. In addition to a more secured facilitation of reputation tokens, leveraging a blockchain system 102, as described, confers further technical benefits. One example technical benefit is ensuring a more transparent performance the transaction, such as transparent movement and tracking of the security deposit.

Therefore, in this manner, the service provider system 104 controls access of the service provider account 204 to transactional functionality using a security deposit based on a tokenized reputation score 206 affiliated with the service provider account 204. In this context, consider the following discussion of FIG. 3.

FIG. 3 depicts an example implementation 300 of a user interface 142 of a client device 106 depicting a request 216 to participate in a transaction using a service provider account 204.

The illustrated example implementation 300 includes from FIG. 1 a depiction of a client device 106 as displaying an example of the service platform 144 via a user interface 142 of the client device 106, e.g., a touchscreen. The implementation 300 also includes from FIG. 2 an example of a reputation score 206 ("600") affiliated with a service provider account 204 (represented as "@pendingpatent"). Further, the implementation 300 includes a listing 302 for an auction transaction of an authentic, luxury watch. The luxury watch is listed by a host service provider account that is represented by a representation 304 ("@fugiocent") that is an online handle. A current top bid 306 ("25 ETH" or $100,000 USD) is included with the listing 302. Below the current top bid 306 is a selectable element 308 that is selectable to submit a request 216 to participate in the transaction. It is to be appreciated that the service platform 144 is configurable to include other selectable elements that are selectable to submit request data 216 for a transaction. In this example illustration, a request is submittable via user input 312, such as via touch. The user interface 142 further depicts a representation 310 of a service provider account 204, "@pendingpatent". Here, a service provider account 204 submits a request 216 to participate in the transaction of listing 302. The request 216 is submitted via user input 312 via the selectable element 308. In this context, consider the following discussion of FIG. 4.

FIG. 4 depicts an example implementation 400 of a user interface 142 of a client device 106 including a response 222 specifying an amount of reputation tokens. This amount is a security deposit for the service provider account 204 to participate in a transaction. The amount of reputation tokens is calculated based on the reputation score 206 affiliated with the service provider account 204.

The illustrated example implementation 400 includes from FIG. 1 a depiction of a client device 106 as displaying an example of the service platform 144 via a user interface of the client device 106, e.g., a touchscreen. The illustrated example implementation 400 also includes from FIG. 2 an example of a reputation score 206 ("600") affiliated with an example service provider account 204. The service provider account 204 is represented via a representation ("@pendingpatent") that is an online handle. The illustrated example implementation 400 also includes from FIG. 3 an example listing 302 for a luxury watch. Here, a response 402 is depicted via the user interface 142 of the client device 106. The response 402 is to an earlier request 216 from the service provider account 204 to participate in the transaction. The response 402 specifies an amount 404 of reputation tokens to be transferred as a security deposit 406, in order for the service provider account 204 to be provided access to the transaction, and thus be enabled to participate in the transaction. To continue this example, implementation 400 also includes a selectable element 408, which is selectable via user input to initiate a process of transferring the amount 404 of reputation tokens specified as the security deposit 406. In this example, the selectable element 408 enables a service provider account 204 to sign into a wallet. In one example, the wallet is a crypto wallet 138, such as Coinbase Wallet, MetaMask, Fortmatic, Portis, TrustWallet, Dapper, Torus, or so forth. In another example, the wallet is a digital wallet. In this context, consider the following discussion of FIG. 5.

FIG. 5 depicts an example implementation 500 of a user interface 142 of a client device 106 depicting providing access to a service provider account 204 to participate in a transaction based on a completed transfer of a security deposit 406.

The illustrated example implementation 500 includes from FIG. 1 a depiction of a client device 106 as displaying an example of the service platform 144 via a user interface of the client device 106. The illustrated example implementation 500 also includes from FIG. 3 an example listing 302 and an example representation 310 of the example service provider account 204 ("@pendingpatent"). The illustrated example implementation 500 also includes an example of an updated reputation score 506 ("500") affiliated with the service provider account 204. The illustrated example implementation 500 further includes an example indication 502 of access provided to the service provider account 204, in addition to a selectable element 504 that is selectable via user input to transact. The indication 502 is provided responsive to a determination that a transfer of a security deposit 406 of an amount 404 (e.g., 100 reputation tokens) is complete from a blockchain account address 214 associated with the service provider account 204. Notably, the updated reputation score 506 ("500") affiliated with the service provider account 204 is lower than the reputation score 206 ("600") before the transfer of the security deposit (as depicted in FIGS. 3 and 4) due to the decrease in reputation tokens 210 associated with the blockchain account address 214 associated with the service provider account 204. As a result, the techniques described here control access of a service provider account 204 to transactional functionality by using an amount of cryptographic reputation tokens as a security deposit 406 based on a tokenized reputation score 206 of the service provider account 204. In this context, consider the following discussion of FIG. 6.

FIG. 6 depicts an example implementation 600 of a user interface 142 of a client device 106 depicting a successful completion of a transaction. A security deposit 406 of reputation tokens of the transaction is returned to a blockchain account address 214 associated with a service provider account 204.

The illustrated example implementation 600 includes from FIG. 1 a depiction of a client device 106 as displaying an example of the service platform 144 via a user interface of the client device 106. The illustrated example implementation 600 also includes from FIG. 3 an example listing 302 listed by a host service provider account and an example representation 310 ("@pending patent") of the example service provider account 204. The example representation 304 of the host service provider account is depicted as "@fugiocent", an online handle. The illustrated example implementation 600 also includes an example of a second updated reputation score 604 ("600") affiliated with the example service provider account 204. Here, the user interface 142 depicts "Paid Invoices" of completed transactions. The user interface 142 displays an indication 602 that the security deposit 406 of the listing 302 has been returned to the blockchain account address 214 associated with the service provider account 204. This is because the transaction was successfully completed. In this example specifically, the transaction was successfully completed because the invoice for the listing 302 was timely paid. In this context, consider the following discussion of FIG. 7.

FIG. 7 depicts an example implementation 700 of a user interface 142 of a client device 106 depicting an unsuccessful completion of a transaction. In this example, return of a security deposit 406 of reputation tokens of the transaction is withheld from a blockchain account address 214 associated with a service provider account 204.

The illustrated implementation 700 includes from FIG. 1 a depiction of a client device 106 as displaying an example of the service platform 144 via a user interface of the client device 106. The illustrated implementation 700 also includes from FIG. 3 an example listing 302 listed by an example representation 304 ("@fugiocent") of a host service provider account of the listing 302. The illustrated example implementation 700 also includes from FIG. 3 an example representation 310 ("@pending patent") of the example service provider account 204. From FIG. 5, an example of an updated reputation score 506 ("500") is included that is affiliated with the service provider account 204. Notably, the updated reputation score from FIG. 5 is unchanged because the security deposit 406 of reputation tokens is not returned. Here, the depicted user interface 142 displays "Unpaid Invoices" of unsuccessful transactions. To continue this example, the user interface 142 displays an indication 702 that the security deposit 406 of the listing 302 is withheld from the blockchain account address 214 associated with the service provider account 204. This is because the transaction was unsuccessfully completed by the service provider account 204. In this specific example, the transaction is unsuccessfully completed because the invoice for the listing 302 remained unpaid for over a threshold period of time after the end of the online auction. As a result, the techniques described here control the return of a security deposit 406 to a service provider account 204 based on a determination of a successful or unsuccessful completion of a transaction.

Example System and Device

Figure 9:
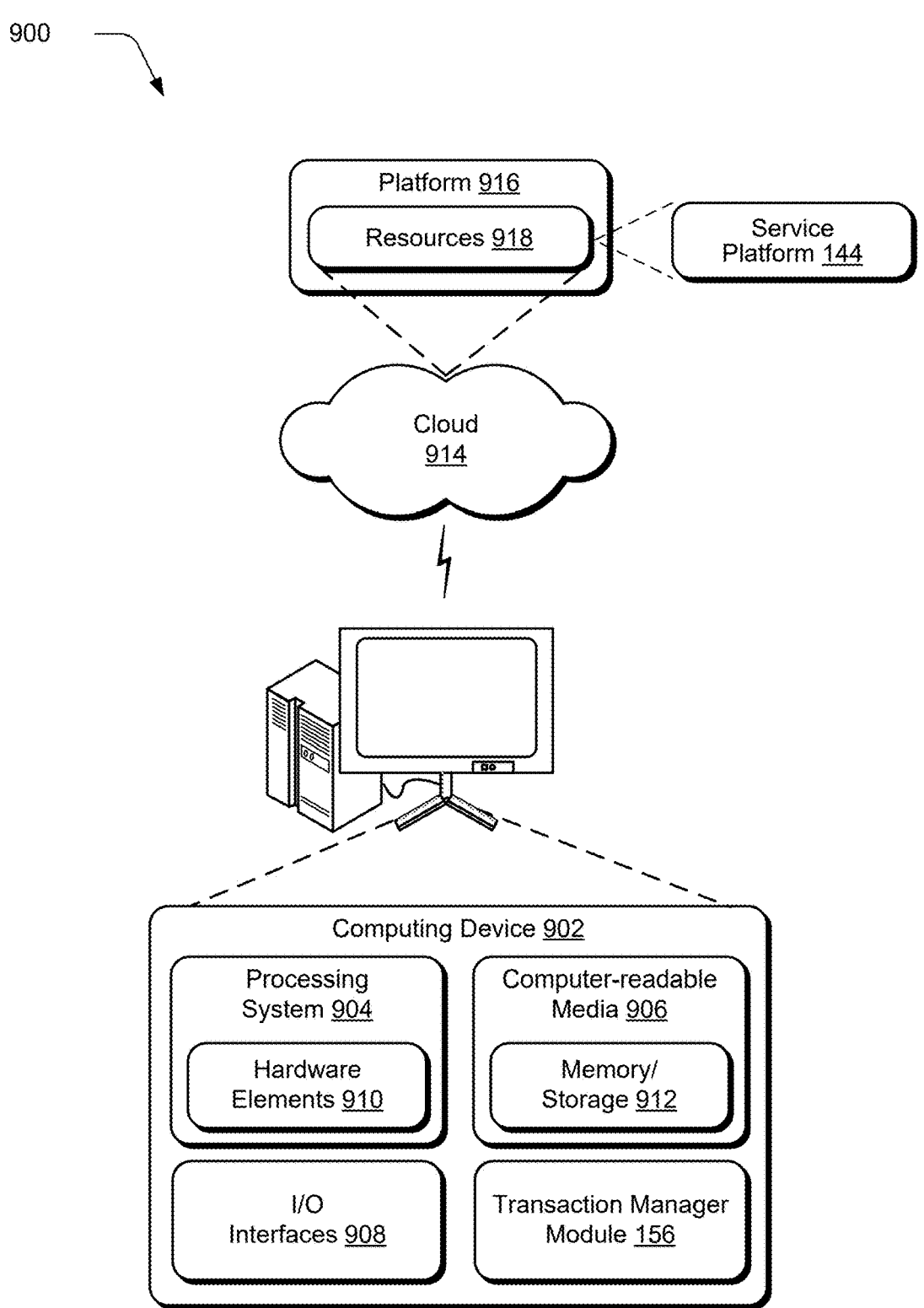
FIG. 9 illustrates an example system including various components of an example device that can be implemented as any type of computing device as described and/or utilize with reference to FIGS. 1-9 to implement embodiments of the techniques described herein.

FIG. 9 illustrates an example system generally at 900 that includes an example computing device 902 that is representative of one or more computing systems and/or devices that may implement the various techniques described herein, such as the nodes of FIG. 1. This is illustrated through inclusion of the service platform 144 and the transaction manager module 156. The computing device 902 may be, for example, a server of a service provider, a device associated with a client (e.g., a client device), an on-chip system, and/or any other suitable computing device or computing system.

The example computing device 902 as illustrated includes a processing system 904, one or more computer-readable media 906, and one or more I/O interface 908 that are communicatively coupled, one to another. Although not shown, the computing device 902 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 904 is representative of functionality to perform one or more operations using hardware. Accordingly, the processing system 904 is illustrated as including hardware element 910 that may be configured as processors, functional blocks, and so forth. This may include implementation in hardware as an application specific integrated circuit or other logic device formed using one or more semiconductors. The hardware elements 910 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 906 is illustrated as including memory/storage 912. The memory/storage 912 represents memory/storage capacity associated with one or more computer-readable media. The memory/storage component 912 may include volatile media (such as random access memory (RAM)) and/or nonvolatile media (such as read only memory (ROM), Flash memory, optical disks, magnetic disks, and so forth). The memory/storage component 912 may include fixed media (e.g., RAM, ROM, a fixed hard drive, and so on) as well as removable media (e.g., Flash memory, a removable hard drive, an optical disc, and so forth). The computer-readable media 906 may be configured in a variety of other ways as further described below.

Input/output interface(s) 908 are representative of functionality to allow a user to enter commands and information to computing device 902, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 902 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 902. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 902, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 910 and computer-readable media 906 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 910. The computing device 902 may be configured to implement particular instructions and/or functions corresponding to the software and/or hardware modules. Accordingly, implementation of a module that is executable by the computing device 902 as software may be achieved at least partially in hardware, e.g., through use of computer-readable storage media and/or hardware elements 910 of the processing system 904. The instructions and/or functions may be executable/operable by one or more articles of manufacture (for example, one or more computing devices 902 and/or processing systems 904) to implement techniques, modules, and examples described herein.

The techniques described herein may be supported by various configurations of the computing device 902 and are not limited to the specific examples of the techniques described herein. This functionality may also be implemented all or in part through use of a distributed system, such as over a "cloud" 914 via a platform 916 as described below.

The cloud 914 includes and/or is representative of a platform 916 for resources 918, the resources 918 including service platform 144. The platform 916 abstracts underlying functionality of hardware (e.g., servers) and software resources of the cloud 914. The resources 918 may include applications and/or data that can be utilized while computer processing is executed on servers that are remote from the computing device 902. Resources 918 can also include services provided over the Internet and/or through a subscriber network, such as a cellular or Wi-Fi network.

The platform 916 may abstract resources and functions to connect the computing device 902 with other computing devices. The platform 916 may also serve to abstract scaling of resources to provide a corresponding level of scale to encountered demand for the resources 918 that are implemented via the platform 916. Accordingly, in an interconnected device embodiment, implementation of functionality described herein may be distributed throughout the system 900. For example, the functionality may be implemented in part on the computing device 902 as well as via the platform 916 that abstracts the functionality of the cloud 914.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by a computing device, the method comprising:

receiving, by the computing device from a service provider account of a service provider system, a request to access a transaction made available by the service provider system;

determining, by the computing device, a blockchain
account address associated with the service provider
account;

determining, by the computing device, a first amount of
reputation tokens associated with the blockchain
account address;

based on the first amount of reputation tokens, generating,
by the computing device, a tokenized reputation score
affiliated with the service provider account;

based on the tokenized reputation score affiliated with the
service provider account, generating, by the computing
device, a second amount of reputation tokens as a
security deposit for the service provider account to
access the transaction made available by the service
provider system;

transmitting, by the computing device, a response speci-
fying the security deposit for the service provider
account to access the transaction made available by the
service provider system;

determining, by the computing device, that the transaction
is permitted by determining that a transfer of the
security deposit from the blockchain account address
associated with the service provider account is com-
plete;

responsive to determining that the transaction is permit-
ted, providing, by the computing device, access to the
service provider account to access the transaction made
available by the service provider system;

determining, by the computing device, a successful
completion of the transaction by receiving completion
data indicating the successful completion of the trans-
action; and responsive to the determining of the successful comple-
tion of the transaction, initiating, by the computing
device, a return of the security deposit to the blockchain
account address associated with the service provider
account.

2. The method of claim 1, wherein the tokenized reputa-
tion score is further calculated based on a transactional
history of the blockchain account address.

3. The method of claim 1, wherein the security deposit is
further calculated based on a plurality of security deposits,
each security deposit of the plurality of security deposits
corresponding to a type of transaction.

4. The method of claim 1, wherein the security deposit is
further calculated based on an amount of currency involved
in the transaction.

5. The method of claim 1, wherein the reputation tokens
are cryptographic utility tokens.

6. The method of claim 1, further comprising responsive
to the determining that the transfer of the security deposit
from the blockchain account address is complete, updating,
by the computing device, the tokenized reputation score
affiliated with the service provider account based on an
updated amount of reputation tokens associated with the
blockchain account address.

7. The method of claim 1, further comprising responsive
to determining the return of the security deposit to the
blockchain account address associated with the service
provider account, updating, by the computing device, the
reputation score affiliated with the service provider account
based on an updated amount of reputation tokens associated
with the blockchain account address.

8. The method of claim 1, wherein the initiating of the
return of the security deposit further comprises triggering
execution of a smart contract.

9. The method of claim 1, wherein the providing of the
access to the service provider account includes automati-
cally executing a predetermined account action.

10. The method of claim 1, wherein the transaction
corresponds to one or more non-fungible tokens.

11. The method of claim 1, further comprising identifying
a type of transaction corresponding to the transaction made
available by the service provider system, and wherein the
generating of the second amount of reputation tokens as the
security deposit is based at least in part on the type of
transaction identified.

12. A method implemented by a computing device, the
method comprising:

receiving, by the computing device from a service pro-
vider account of a service provider system, a request to
access a transaction made available by the service
provider system;

determining, by the computing device, a blockchain
account address associated with the service provider
account;

determining, by the computing device, a first amount of
reputation tokens associated with the blockchain
account address;

based on the first amount of reputation tokens, generating,
by the computing device, a tokenized reputation score
affiliated with the service provider account;

based on the tokenized reputation score affiliated with the
service provider account, generating, by the computing
device, a second amount of reputation tokens as a
security deposit for the service provider account to
access the transaction made available by the service
provider system;

transmitting, by the computing device, a response speci-
fying the security deposit for the service provider
account to access the transaction made available by the
service provider system;

determining, by the computing device, that the transaction
is permitted by determining that a transfer of the
security deposit from the blockchain account address
associated with the service provider account is com-
plete;

responsive to determining that the transaction is permit-
ted, providing, by the computing device, access to the
service provider account to access the transaction made
available by the service provider system;

determining, by the computing device, an unsuccessful
completion of the transaction by receiving completion
data indicating the unsuccessful completion of the
transaction; and responsive to the determining of the unsuccessful comple-
tion of the transaction, withholding, by the computing
device, return of the security deposit to the blockchain
account address associated with the service provider
account.

13. The method of claim 12, wherein the tokenized
reputation score is further calculated based on a transac-
tional history of the blockchain account address.

14. The method of claim 12, wherein the security deposit
is further calculated based on a plurality of security deposits,
each security deposit of the plurality of security deposits
corresponding to a type of transaction.

15. The method of claim 12, wherein the security deposit
is further calculated based on an amount of currency
involved in the transaction.

16. The method of claim 12, further comprising respon-
sive to the determining that the transfer of the security
deposit from the blockchain account address is complete, updating, by the computing device, the tokenized reputation score affiliated with the service provider account based on an updated amount of reputation tokens associated with the blockchain account address.

17. The method of claim 12, further comprising initiating, by the computing device, distribution of the security deposit to each blockchain account address associated with each service provider account participating in the transaction other than the service provider account.

18. The method of claim 17, wherein the initiating of the distribution of the security deposit further comprises triggering execution of a smart contract.

19. The method of claim 17, wherein the distribution of the security deposit is from a contract address.

20. A system comprising:

a transaction manager module implemented at least partially in hardware of a computing device to receive a request for a service provider account of a service provider system to access a transaction made available by the service provider system;

a reputation management module implemented at least partially in the hardware of the computing device to:

determine a blockchain account address associated with the service provider account; and determine a first amount of reputation tokens associated with the blockchain account address;

a reputation management module implemented at least partially in the hardware of the computing device to generate, based on the first amount of reputation tokens, a tokenized reputation score affiliated with the service provider account, in which the tokenized reputation score is generated based on a first amount of reputation tokens associated with a blockchain account address associated with the service provider account;

a security deposit manager module implemented at least partially in the hardware of the computing device to:

calculate, based on the tokenized reputation score affiliated with the service provider account, a second amount of reputation tokens as a security deposit for the service provider account to access the transaction made available by the service provider system; and transmit a response specifying the security deposit for the service provider account to access the transaction made available by the service provider system;

a security deposit monitoring module implemented at least partially in the hardware of the computing device to:

determine whether the transaction is permitted by monitoring for completion of a transfer of the security deposit from the blockchain account address associated with the service provider account; and determine the completion of the transfer of the security deposit from the blockchain account address associated with the service provider account; and an access control module implemented at least partially in the hardware of the computing device to control access to the service provider account to the transaction based on the completion of the transfer of the security deposit.

\* \* \* \* \*